United States Patent
Holm et al.

(10) Patent No.: US 11,050,675 B2
(45) Date of Patent: Jun. 29, 2021

(54) SCHEDULER FOR COORDINATION AND SYNCHRONIZATION OF DATA ACROSS LOW-BANDWIDTH LINKS AND METHOD THEREOF

(71) Applicant: BAE SYSTEMS INFORMATION AND ELECTRONIC SYSTEMS INTEGRATION INC., Nashua, NH (US)

(72) Inventors: Michael W. Holm, Escondido, CA (US); Michael A. Jeamel, Utica, NY (US); Erik Visnyak, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 105 days.

(21) Appl. No.: 16/427,887

(22) Filed: May 31, 2019

(65) Prior Publication Data
US 2020/0382435 A1    Dec. 3, 2020

(51) Int. Cl.
| | | |
|---|---|---|
| *H04L 12/875* | (2013.01) | |
| *H04L 12/927* | (2013.01) | |
| *H04L 12/801* | (2013.01) | |
| *H04L 12/851* | (2013.01) | |
| *H04L 29/08* | (2006.01) | |

(52) U.S. Cl.
CPC ............ *H04L 47/56* (2013.01); *H04L 47/193* (2013.01); *H04L 47/245* (2013.01); *H04L 47/805* (2013.01); *H04L 69/326* (2013.01)

(58) Field of Classification Search
CPC ...... H04L 47/56; H04L 47/193; H04L 47/245; H04L 47/805
See application file for complete search history.

(56) References Cited

U.S. PATENT DOCUMENTS

| | | |
|---|---|---|
| 5,463,620 A | 10/1995 | Sriram |
| 7,657,942 B2 | 2/2010 | Himberger et al. |
| 7,761,609 B1 | 7/2010 | Srinivasan et al. |
| 8,051,017 B2 | 11/2011 | Munson et al. |
| 8,085,781 B2 | 12/2011 | Munson et al. |
| 8,214,707 B2 | 7/2012 | Munson et al. |
| 8,583,977 B2 | 11/2013 | Munson et al. |

(Continued)

OTHER PUBLICATIONS

Krzyzanowski. "Quality of Service." Sep. 29, 2012 (Sep. 29, 2012) Retrieved on Jul. 19, 2020 (Jul. 19, 2020) from <https://www.cs.rutgers.edu/-pxk/417/notes/03-qos.html> entire document.

(Continued)

*Primary Examiner* — Suraj M Joshi
(74) *Attorney, Agent, or Firm* — Sand, Sebolt & Wernow LPA; Scott J. Asmus (57) ABSTRACT

A network system provides architecture for transmitting data across low-bandwidth links via user datagram protocol (UDP) via a scheduler that schedules, prioritizes, and collaborates data for transmission. The schedule coordinates low priority data and high priority data that may interrupt the low priority data in response to preset rules programmed into an automatic decision module. The automatic decision module may also include variable rules that can vary in response to machine learned information occurring or incoming to the system in situ.

19 Claims, 5 Drawing Sheets

(56) References Cited

U.S. PATENT DOCUMENTS

| | | | |
|---|---|---|---|
| 8,719,443 B2 | 5/2014 | Xu et al. | |
| 8,909,560 B2 | 12/2014 | Munson et al. | |
| 8,996,945 B2 | 3/2015 | Munson et al. | |
| 9,461,835 B2 | 1/2016 | Simu et al. | |
| 9,276,865 B2 | 3/2016 | Xu et al. | |
| 9,419,907 B2 | 8/2016 | Munson et al. | |
| 9,667,545 B2 | 5/2017 | Xu et al. | |
| 10,084,654 B2 | 9/2018 | LaBrie et al. | |
| 10,205,801 B2 | 2/2019 | Bright et al. | |
| 2005/0058149 A1 | 3/2005 | Howe | |
| 2010/0309931 A1 | 12/2010 | Shapira et al. | |
| 2013/0018987 A1 | 1/2013 | Seaman et al. | |
| 2014/0347978 A1* | 11/2014 | Kim | H04W 28/0231 370/225 |
| 2015/0043345 A1* | 2/2015 | Testicioglu | H04L 47/24 370/232 |
| 2018/0278482 A1 | 9/2018 | LaBrie et al. | |
| 2019/0364492 A1* | 11/2019 | Azizi | H04W 52/0264 |

OTHER PUBLICATIONS

International Search Report, PCT/US20/34702, dated Aug. 11, 2020, 7 pages.

\* cited by examiner

SCHEDULER FOR COORDINATION AND SYNCHRONIZATION OF DATA ACROSS LOW-BANDWIDTH LINKS AND METHOD THEREOF

TECHNICAL FIELD

The present disclosure relates generally to a system network having low-bandwidth links transmitting information via a User Datagram Protocol (UDP). More particularly, the present disclosure relates to a scheduler or scheduling device that coordinates and synchronizes data across low-bandwidth links via UDP.

BACKGROUND

With recent increases in network bandwidth, the ubiquitous interconnectedness of users through the global Internet, and the increasing volume of digital data processed by business and consumer users, the demands for network-based transfer of bulk data (files and directories) are ever growing. In particular, users desire to transfer larger files, over networks of ever higher bandwidths, and at ever longer distances.

Such data transfer paths not only experience high bottleneck bandwidths and round-trip delays due to geographical distance, but they also experience periods of packet losses, and variable delays due to the media itself (e.g. wireless), and to variable and sometimes excessive, traffic congestion.

Conventional bulk data transfer protocols based on the Transmission Control Protocol (TCP) suffer from severe performance limitations over typical global Internet paths, due to the poor performance of TCP over networks with high bandwidth-delay products. Much attention has focused on implementations and alternative transport protocols for improving performance (transfer speed and bandwidth utilization) for bulk data transfer on high-bandwidth, high-delay networks. However, current approaches offer improved throughputs and bandwidth utilization primarily on links in the Internet core, which have relatively low bit error rates (BER) and have an abundance of bandwidth, avoiding traffic congestion. However, the majority of user data transfers span the network edge-to-edge, and not only experience high round-trip delays due to geographical distance, but also experience periods of packet losses and variable delay characteristic of the typical "edge" network. On typical edge networks, current approaches fail to achieve full bandwidth utilization, suffer from variable throughputs as congestion increases, and cannot provide sufficient guarantees on transfer times required by time-critical business processes and demanding consumer users. Furthermore, in the limited cases where current approaches do improve throughput, they do so at the expense of fair sharing of bandwidth with other network applications, and provide the end user no control over the bandwidth sharing. The end user is forced to choose between a poorly performing but "fair" standard TCP implementation, or an alternative new protocol that provides improved throughput in limited cases but at the expense of bandwidth fairness. While this may be acceptable in the Internet core, it is not acceptable on the often over-subscribed edge networks where data transfers are admitted to networks with limited available bandwidth. There is a need in the art for a system for data transfer that addresses the foregoing concerns and provides improved throughput, predictable transfer speeds independent of the network distance or congestion (and associated delays and packet losses), automatic full utilization of bandwidth, and the ability to share bandwidth proportionally with other traffic when no bandwidth is unused, taking into account both current and future implementations of the TCP protocol.

SUMMARY

One problem associated with communications, is unreliable connections between nodes and the communication network. Some issues that are associated with unreliable communications occur when a satellite link goes down or when a node loses sight with another node to permanently or temporarily lose the communication link. Thus, the present disclosure provides a solution that enables communication between different nodes or echelons in the organization from the high levels that are always connected or have substantially continuous connectivity down to the lower level nodes (i.e., boots on the ground) that sometimes get disconnected and have no communication back to their parent organization.

The system of the present disclosure enables multi-site collaboration and data synchronization over unreliable data networks and includes a blend of commercial of the shelf (COTS) products and internally developed software. The present disclosure provides an optimized-UDP solution that scales to utilize the available network bandwidth and performs up to 1000% more efficient than TCP over long distances. Data transfers continue where they left off when connections are reestablished and support data transfer priorities. This solution allows users to collaborate in a shared workspace across multiple nodes, allow them to work on the same intelligence problem together in near real-time. At the application level instructions, algorithms, or software can automatically synchronize data (or a subset of data) between nodes for backup capabilities and to push relevant data to the operators who need that data.

In one exemplary embodiment, the present disclosure also takes advantage of an optimized UDP solution. The term "UDP" refers to User Datagram Protocol. The UDP is a way in which data can be sent across a communication network between two nodes or two systems. A UDP removes many of the required digital handshakes often associated with a TCP protocol. Thus, UDP is an optimized communication protocol that enables a greater percentage of the available bandwidth to be used to transmit messages across a communication link. The UDP system transmits a broad amount of data across the communication link and the applications or the nodes at the respective ends of the communication link reassemble the transmitted data across the UDP link in order to fulfill the message delivery or transmission. Thus, the present disclosure using an optimized UDP protocol provides a significantly greater bandwidth optimization and utilization for the communication network. The UDP protocol can send approximately a 1,000 times more data over the same bandwidth than some solution that uses a TCP solution. Intermittent or limited communication in low bandwidth systems (less than 1 gigabyte) is common in long distance communications. Thus, being able to optimize the transmission to maximize the amount of bandwidth utilization on a low bandwidth communication link is critical. The communication system of the present disclosure is scalable into whatever bandwidth is available. Thus, if very small bandwidth is available, then the communication system of the present disclosure can send as much data as possible through that small bandwidth. If there is a greater amount of bandwidth available, then the solution scales up to allow the data to fill the amount of available bandwidth with moving data from the first node to the second node.

The present disclosure provides connectivity between nodes and the communication network in a number of different ways. In one particular example, the system of the present disclosure provides an automatic continuation when connections are dropped. In conventional systems, when large files are sent across a communication link and the link is dropped, the conventional systems require the file to be re-sent from the beginning once the connection is re-established. The present disclosure provides automatic continuation to enable the file to pick up where it was when it last left off when the dropped connection occurred. The communication system of the present disclosure further provides a message priority protocol. For example, if a low priority video needs to be transmitted between two nodes on the communication network, the priority protocol may rank this type of communication as a low priority in order to save bandwidth so that higher priority transmissions can utilize the communication network first. The priority protocol allows an interruption to occur such that when a high priority communication transmission needs to occur, the high priority communication may interrupt the lower priority communication occurring on the network. The priority que is user tailorable or set by the user to determine what types of messages have a higher ranking priority compared to other messages that would have a lower ranking priority. Further, the ability of the protocol to be tailored enables the user to adjust continuously the priority protocol so that the priority rules are not static and may be changed at any time. The system enables an improved communication protocol over a disconnected, disrupted intermittent, limited, communication (D/DIL) network. As a whole, the communication system of the present disclosure allows for effective operation in a particular situation when communication nodes in a network may drop.

In one aspect, an exemplary embodiment of the present disclosure may provide a system comprising: a first node; a second node; a low-bandwidth link coupling the first node the second node; and a scheduler in operative communication with the first node to prioritize and schedule data for transfer between the first node and the second node across the low-bandwidth link; and a User Datagram Protocol (UDP) to transfer data across the low-bandwidth link that has been prioritized and scheduled by the scheduler. This exemplary embodiment or another exemplary embodiment may further provide an automatic decision module within the scheduler that prioritizes data for sending higher priority data across the low-bandwidth link via the UDP protocol before lower priority data based on a set of preset rules. This exemplary embodiment or another exemplary embodiment may further provide wherein the automatic decision module interrupts the lower priority data in response to a decision that higher priority data must be sent across the low-bandwidth link via UDP. This exemplary embodiment or another exemplary embodiment may further provide a machine implemented learning module in operative communication with the automatic decision module within the scheduler for learning additional rules that affect the preset rules based on scenarios occurring after programming the preset rules. This exemplary embodiment or another exemplary embodiment may further provide variable rules in the scheduler that reprioritizes and transmit data based, at least in part on, real-time queries from the first node to the second node. This exemplary embodiment or another exemplary embodiment may further provide a shared workspace for the first and second nodes adapted to share data across the low-bandwidth link, wherein data for the shared representation is transmitted across the low-bandwidth link via the UDP protocol between the first node and the second node. This exemplary embodiment or another exemplary embodiment may further provide wherein the shared workspace between the first and second nodes comprises: a common graphical representation adapted to represent tasks for each respective node that is the same or similar at both the first node and the second node; wherein data for the common graphical representation is transmitted across the low-bandwidth link via the UDP protocol between the first node and the second node. This exemplary embodiment or another exemplary embodiment may further provide wherein the common graphical representation includes a map depicting relational points that collaboratively identify a solution to an intelligence task; wherein data plotted into the map is transmitted across the low-bandwidth link via the UDP protocol between the first node and the second node. This exemplary embodiment or another exemplary embodiment may further provide active communication periods and inactive communication period between the first and second nodes; wherein the scheduler transmits high priority data, as determined by a set of rules, during active communication periods, and transmits low priority data, as determined by the set of rules, during inactive communication periods. This exemplary embodiment or another exemplary embodiment may further provide a manual data transfer override that interrupts the prioritized and schedule data transfer to transmit data across the low-bandwidth link, wherein data for that overrides and interrupts a previously scheduled data transfer is transmitted across the low-bandwidth link via the UDP protocol between the first node and the second node.

In another aspect, an exemplary embodiment of the present disclosure may provide a method comprising: scheduling and prioritizing data in a scheduler for data to be sent from a first node; transmitting the scheduled and prioritized data from the first node to a second node across a low-bandwidth link via a user datagram protocol (UDP); receiving the scheduled and prioritized data at the second node; deciding, automatically via an automatic decision module, whether different data having a higher priority should interrupt the low-bandwidth link via the UDP protocol before lower priority data based on a set of preset rules; and interrupting lower priority data and transmitting the higher priority data across the low-bandwidth link via the UDP. This exemplary embodiment or another exemplary embodiment may further provide programming preset rules in the automatic decision module for determining whether higher priority data is to interrupt data on the low-bandwidth link; and learning, via a machine implemented learning module in operative communication with the automatic decision module, supplementary rules that affect the set of preset rules based on scenarios occurring after programming the set of preset rules were programmed. This exemplary embodiment or another exemplary embodiment may further provide resuming transmission of the lower priority data across the low-bandwidth link via UDP subsequent to completing transmission of the higher priority data that interrupted the lower priority data from transmitting, wherein the low priority data resumes from a data packet that was interrupted and does not revert to the initial data packet of the lower priority data. This exemplary embodiment or another exemplary embodiment may further provide wherein scheduling and prioritizing data in the schedule is accomplished by coupling a sender scheduler to an application in a sender system first node and coupling a receiver scheduler to an application in receiver system second node. This exemplary embodiment or another exemplary embodiment may further provide collaborating data between the first and second nodes across the low-bandwidth link; sharing the collaborated data in a common workspace; and identifying a target based on a first portion of data from the first node and a second portion from the second node. This exemplary embodiment or another exemplary embodiment may further provide setting rules in both the sender scheduler and the receiver scheduler to send and receive lower priority data during network inactive periods; and setting rules in both the sender scheduler and the receiver scheduler to reserve bandwidth in the low-bandwidth link to send and receive higher priority data during active periods. This exemplary embodiment or another exemplary embodiment may further provide synchronizing lower priority data with preset rules in the scheduler; wherein subsequent to interrupting the low priority data includes re-synchronizing the lower priority data with the preset rules in the scheduler. This exemplary embodiment or another exemplary embodiment may further provide responding to variables input from an external node into the network across a low-bandwidth link via UDP; altering rules in the scheduler for transmitting low priority data to a later time frame; and transmitting higher priority data before the lower priority data in response to requirements of the variables. This exemplary embodiment or another exemplary embodiment may further provide receiving higher priority data including a task message; and interrupting lower priority data including a video file that is larger in data size than the task message.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
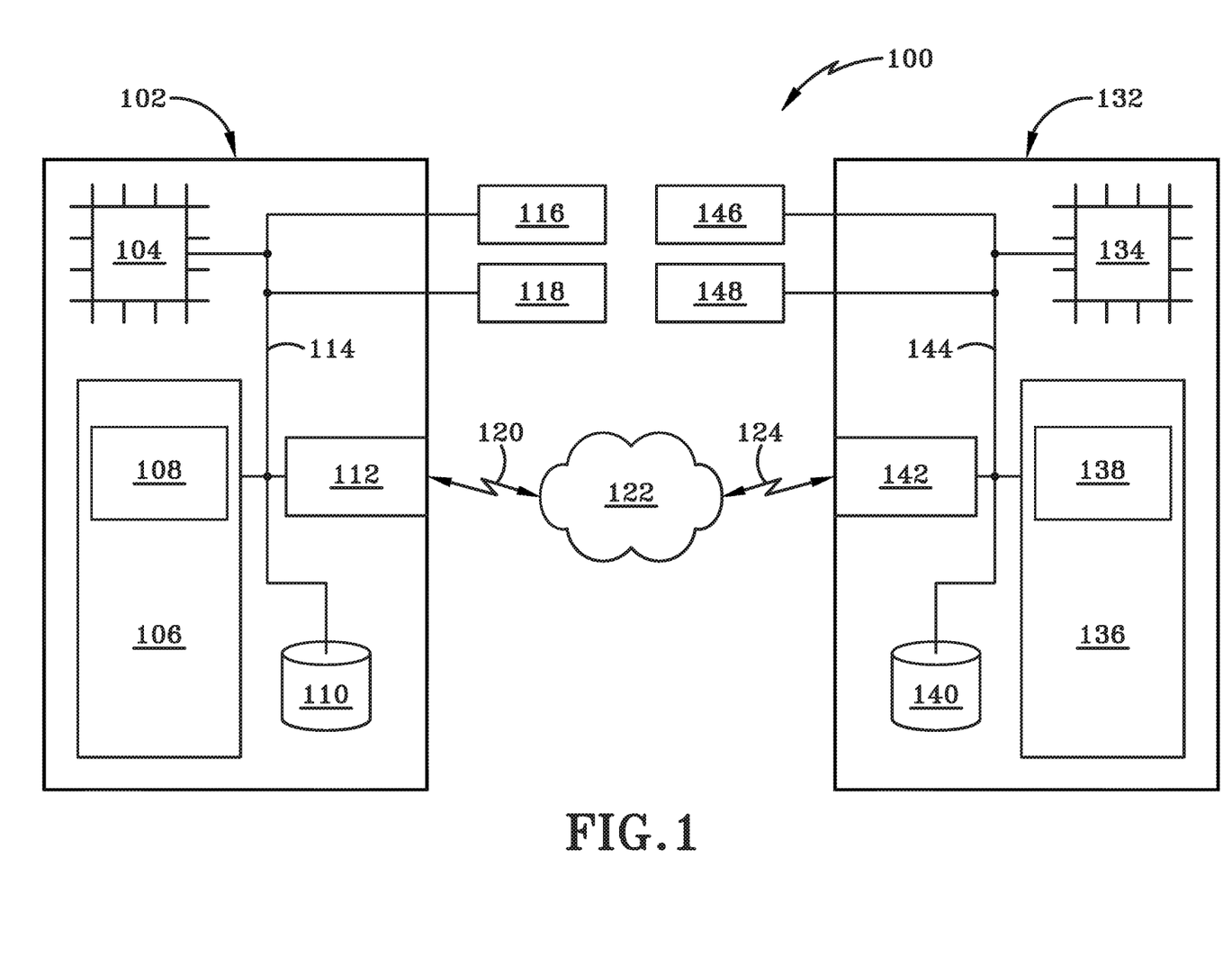
FIG. 1 is a schematic block diagram of a system according to an exemplary embodiment of the present disclosure.

FIG. 1 is a schematic block diagram of a system 100 according to an example embodiment of the present disclosure. The system 100 includes a first node 102 and a second node 132 connected by a network 122.

The first node 102 includes a processor 104, a memory 106 and a network interface 112 coupled to bus 114. The first node 102 can optionally include a storage device, such as disk 110, an output device 116 and an input device 118. The second node 132 includes a processor 134, a memory 136, and a network interface 142 coupled to bus 144. The second node 132 can optionally include a storage device, such as disk 140, an output device 146, and an input device 148. In varying examples, the memories 106, 136 of both the first node 102 and the second node 132 are illustrated as including software 108, 138. Such software includes functionalities for at least communication of data to the network interface. In varying embodiments and applications, such software may be loadable to the memories 108, 138 from one or more sources, including, but not limited to storage 110, 140.

The network 122, in various embodiments, includes one or more of the INTERNET, a local area network ("LAN"), an intranet, a wide area network ("WAN"), or other network type.

The software 108, 138 is operable on the processor 104, 134 of its respective node 102, 132 to enable the nodes 102, 132 to exchange data over the network 122. The software 108, 138 causes the nodes 102, 132 to perform various actions associated with the exchange of data. These actions include exchanging data according to various timed acknowledgement methods as demonstrated below.

There are references to data transfer in this discussion in terms of an end-to-end "transfer path." The transfer path extends from the source host, such as the first node 102, to a destination host, such as the second node 132, across an Internet Protocol (IP) network, such as the network 122. The transfer path has a characteristic "bottleneck bandwidth," a "network round-trip time," and a "path round-trip time."

The path bottleneck bandwidth is referred to as the minimum data transmission capacity (data units per unit time) along the entire length of the transfer path. It includes the bottleneck capacity of the sending and receiving hosts, such as the first node 102 and the second node 132, and the bottleneck capacity of the network 122, including one or more network hops. The bottleneck capacity of the nodes 102, 132 is the minimum data throughput (data per unit time) of the resources used in a data transfer, including the storage 110, 140 or memory 106, 136 read/write speed, the speed of the host bus 114, 144, the processor 104, 134 speed, and the network interface 112, 142 speed. The bottleneck capacity of the network 122 is the minimum bandwidth of the individual network links comprising the network path.

The path round-trip time ("path RTT") is the time required for a data unit to travel from the data receiver to the source and back. The path RTT, for example, includes the time to read the data unit from the second node 132 storage 140 or memory 136, transmit the data unit back over the network 122 to the first node 102, and read the data unit into memory 106, and transmit the data unit back over the network 122 to the second node 132 and read the data unit into memory 136. In one example, the time is measured using time "ticks" on the packet indicating the initiation of transmission and ultimately the time of reception.

The network round-trip time ("network RTT") is the time required for a data unit to travel over the network 122 beginning from the time it is sent over the network by the receiving host, to the time that the data unit arrives at the sending host, and then back to the receiving host, sometimes referred to as the "network latency."

In various embodiments, the network RTT includes the time for the request to travel "down the communication stack" in the destination host (network protocol layer to the network stack in the operating system to the physical interface), the time for the request to travel over the network to sending host, the time for the sending host to receive the retransmission request and to send the next scheduled data unit (includes a pass "up the stack" to receive the incoming retransmission request (physical interface to the network stack in the operating system to the system protocol layer)

and a pass "down the stack" to send the next scheduled data unit (system protocol layer to network stack in the operating system to the physical interface), plus the time to travel over the network to the destination host.

The bandwidth-delay product ("BDP") of a given transfer path is an expression of the total data capacity of the path and is equal to the bottleneck bandwidth times the round-trip time. For the purposes of this disclosure BDP is referred to in terms of the network round-trip time, but note that for very high bandwidth networks the bottleneck bandwidth and BDP can actually be determined by the host bandwidth.

The data transfer is defined in terms of "data injection rate," "reception rate," and "useful reception rate," which determine "efficiency." The data injection rate ("Ri(t)") is the rate at which a sender injects data into the network on behalf of a sending application (e.g. measured in bits or bytes per second). The data reception rate ("Rr(t)") is the rate at which a receiver reads data from the network 122 on behalf of the receiving application. The useful reception rate ("Ru(t)") is the rate at which the receiver receives "useful" data, which includes data that has not been received previously (e.g. duplicate data).

Also used throughout this description are the terms "duplicate reception rate" and "transfer efficiency." The duplicative reception rate ("Rd(t)") is the rate at which the Receiver receives data already received.

Transfer efficiency is the ratio of the useful reception rate to the total reception rate (Ru/Rr). Maximum transfer efficiency (100%) is achieved when Ru approaches Rr and no duplicate data is received (meaning the protocol's redundant data overhead is negligible): Ru/Rr=1 and Rd=0.

A "perfectly efficient" protocol transfers all of the data required, which may require retransmission of lost data due to packet losses on the transfer path, with no redundant transmissions. Note that efficiency is not the same as the bandwidth utilization.

A stable system 100, according to various embodiments, converges to a steady-state throughput that does not oscillate in bandwidth usage in the face of packet loss, network delay and variation of packet loss and network delay. This allows the application 108 on system 102 to choose an arbitrary data injection rate Ri without disrupting the stability of the system 100. If the system 100 uses a fixed target rate, data is steadily injected onto the network 122 and does not create "bursts." In some embodiments, where the system 100 uses a dynamically adaptive rate, the rate evolves to an equilibrium rate in proportion to the distance from the equilibrium, not the current transfer rate, for stability at high rates. A stable protocol using a dynamically adaptive rate also does not overfill intervening router buffers in the transfer path and impair small "mice" traffic.

Some embodiments include parameters that are used to measure the system 100 performance include "predictability," "bandwidth fairness," and "independent rate control." The useful data reception rate (Ru) is "predictable" if the transfer throughput and time is deterministic over variable and unpredictable path conditions, such as variable round-trip latency, and packet loss.

A protocol is considered "bandwidth-fair" to standard TCP ("TCP friendly") if a single flow competing with TCP is equally aggressive and shares the bottleneck bandwidth BW in equal proportion, such that the rate of each flow is BW/N for N competing flows. For high performance and fairness on commodity networks, a reliable transfer protocol both shares fairly with TCP and has "max-min" fairness: When a TCP flow does not use its full proportional share of the bandwidth, the system 100, in some embodiments, consumes the remaining bandwidth.

The system 100 offers "independent rate control" to an application if the data injection rate is not coupled to the reliability mechanism, and the system 100 exposes an interface to the application to use in manipulating the rate control. Some parameters of various embodiments that can be manipulated include discrete rate settings such as a target rate or max/min ranges, relative aggressiveness, and prioritization policies. The system 100, in some embodiments, also provides intelligent feedback to the application, such as performance statistics, such as effective rate, contiguous bytes transferred, and the measured network impact in the form of round-trip time, packet loss on the transfer path, and protocol overhead.

To achieve the properties of system 100 described above (stability and predictability in the face of packet loss, network delay and variation of packet loss and network delay, efficiency Ru/R⁻1 and independent rate control), the proposed embodiments for a reliable bulk data transport system provide the following processes: a. Retransmission requests are stored on the receiver when blocks are lost; b. The retransmission request storage has the following data structure properties: i. insertion time in storage must be in constant time O(1); ii. retrieval or retransmission to be requested must be in constant time O(1); and iii. finding and canceling pending retransmission request(s) when the retransmitted block is received must be in constant time O(1); and c. Retransmission requests received by the sender are stored in sender storage. The sender storage must not grow when packet loss grows; i. receiver only sends retransmission requests at the rate that sender can send retransmitted blocks; ii. sender storage of retransmission requests must allow for constant insertion time (the proposed embodiment provides a logarithmic insertion time O(log(n)), but since the size of the sender storage doesn't grow with the increase in packet loss, the insertion time is practically constant); iii. sender must send retransmitted blocks in order (smallest index first) for optimizing disk read performance, so finding minimum retransmission index in storage must be in constant time O(1); d. Retransmission requests must reach the sender without delay. The receiver sends retransmission requests in packets of the smallest size possible given the amount of retransmission requests that need to be sent and the rate at which they have to be sent; e. The receiving system must process the incoming data at the rate at which it is received. If data must be written to the receiving system's disk, it has to be done optimally; f. If the receiving system cannot process the incoming data at the rate at which it is received, due to system limitations, the incoming data is dropped and considered the dropped blocks are considered lost for the purpose of the retransmission mechanism.

One exemplary UDP protocol is provided by IBM Aspera and is commercially known as FASP. The FASP transfer technology eliminates certain fundamental shortcomings of conventional, TCP-based file transfer technologies such as FTP and HTTP. As a result, FASP transfers achieve speeds that are hundreds of times faster than FTP/HTTP and provide a guaranteed delivery time regardless of file size, transfer distance or network conditions, including transfers over satellite, wireless, and inherently unreliable long distance, international links. FASP also provides complete visibility into bandwidth utilization and extraordinary control over transfer rates and bandwidth sharing with other network traffic. Complete security is built-in, including secure endpoint authentication, on-the-fly data encryption, and integrity verification. See https://asperasoft.com/technology/transport/fasp/. The IPM Aspera FASP UDP protocol is explained in more detail in U.S. Pat. Nos. 8,051,017; 8,085,781; 8,214,707; 8,583,977; 8,909,560; 8,996,945; is entirely incorporated by reference as if fully rewritten herein. The present disclosure in one example leverages the FASP as one of the UDP mechanisms and provides for an improved FASP.

Figure 2:
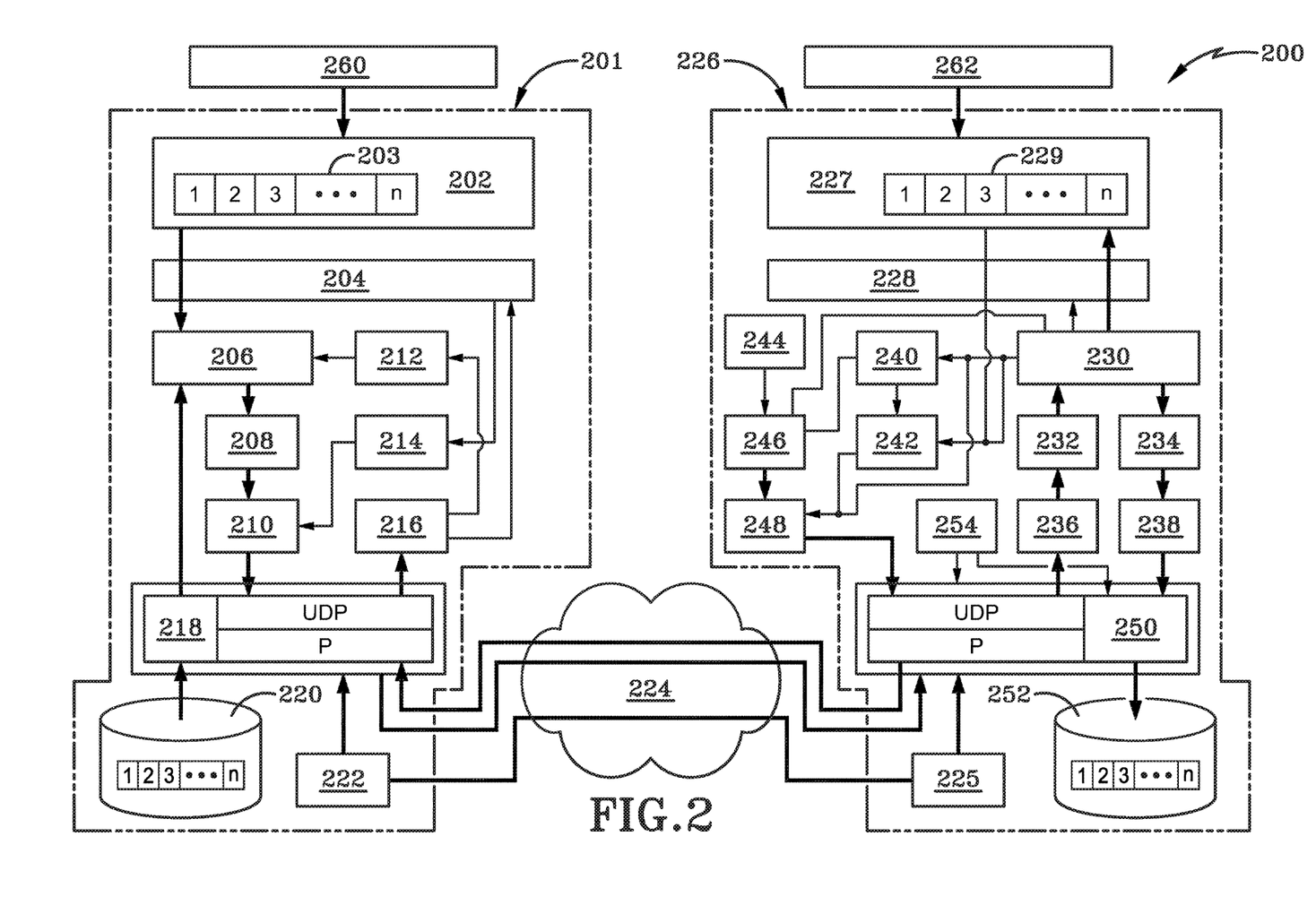
FIG. 2 is a block diagram of a sender/receiver system according to one exemplary embodiment of the present disclosure.

FIG. 2 is a block diagram of a prioritized UDP protocol system 200 according to an example embodiment of the present disclosure. The system 200 includes a sender system 201 and a receiver system 226. The sender system 201 and the receiver system 226 are connected to one another via a network 224. A sender scheduler 260 is connected with the sender system 201 and the receiver scheduler 262 is connected with the receiver system 226. The schedulers 260, 262 may be in operative communication. The schedulers 260, 262 may be logic modules having prioritized data that direct are transferred across the UDP protocol system 200 from the sender system 201 to the receiver system 226. Scheduler 260 may be a scheduling module or scheduling logic that is operative to execute a set of instructions that prioritize and schedule data for transmission across a low-bandwidth link using UDP protocol. As used herein, low bandwidth link is less than about 1.2 Mbps.

System 200 may use an underlying UDP such that schedulers 260, 262 offer data transfer scheduling, data priority management, and time of day scheduling. The present disclosure determines what goes onto the communication link along network 224. Sending the information across the link in network 224 is accomplished through the transfer protocol (such as UDP protocol). Thus, the schedulers 260, 262 system of the present disclosure prioritizes what information begins at the sender system 201 (i.e., a first node) and is sent across the communication link in the network 224 to the receiver system 226 (i.e., a second node), when the data is sent, and the different priorities of data to be sent. Then, the underlying UDP protocol transmits the information that has been prioritized by the system of the present disclosure in the bandwidth available fashion.

The sender system 201 of the system 200 embodiment includes a set of modules. These modules include a transfer initiation module 222, a data file system source module 218, a data application source module 203, a block handler module 206, and an optional cryptography module 208. The sender system 201 further includes a block egest module 210, a feedback reader module 216, a rate control module 214, a retransmission module 212, a management interface module 204, and a transfer initiation module 222.

The transfer initiation module 222 handles the establishment of a control channel with the receiver system 226. The control channel can use a reliable or unreliable base transport (e.g. TCP or UDP). The control channel can also be secured using a public-private key method, such as Secure Sockets Layer ("SSL") or Secure Shell ("SSH"). Using the control channel, the transfer initiation module 222 handles authentication on behalf of the sender application 202 by sending credentials to the receiver system 226, and can optionally exchange a per-session symmetric encryption key to use in data encryption. The transfer initiation module 222 also handles negotiation of transfer parameters, such as block size, target rate, etc., and exchanges the file or directory metadata for constructing the destination file and resuming partial transfers. Metadata includes attributes such as file name, size, access control parameters, and checksum.

The data file system source module 218 provides a sequence of data to transfer from a disk 220 or memory accessible to the sender system 201 through the sender system 201 file system 218. The sequence can be a file, a directory, a raw byte sequence, or virtually any other type or form of data.

The data application source module 203 provides a sequence of data to transfer in the sender application's 202 memory space.

The block handler module 206 ingests data by reading data blocks from the file system or from the user application's 202 memory space 203 when needed for transmission or retransmission.

The cryptography module 208 is an optional module within the sender system 201. The cryptography module 208 optionally encrypts data blocks and adds authentication digests for integrity verification. The block egest module 210 writes data blocks to the network 224.

The feedback reader module 216 reads control feedback information from the receiver system 226, including requests for retransmission of missed blocks, transfer statistics, and the dynamic target rate. The feedback reader module 216 parses the message type and passes the payload to the appropriate module for processing, such as the retransmission module 212, the rate control module 214, or the management interface 204.

The rate control module 214 schedules blocks for transmission to respect the target rate (e.g. bits per second). The retransmission module 212 stores incoming retransmission requests in a data structure that allows sorting by sequence number. The retransmission module 212 further issues block numbers to retransmit. The management interface module 204 provides a monitoring and control interface from which control commands are issued and transfer statistics are read.

The receiver system 226 of the system 200 embodiment includes a set of modules. These modules include a transfer initiation module 225, a data file system destination module 250, a data application destination module 227, a block handler module 230, and an optional cryptography module 232. The receiver system 200 further includes a block ingest module 236, a feedback writer module 248, a rate control module 242, a retransmission module 246, a management interface module 228, and a transfer initiation module 225.

The transfer initiation module 225 handles the establishment of a control channel with the sender system 201. The control channel can use a reliable or unreliable base transport (e.g. TCP or UDP). The control channel can also be secured using a public-private key method, such as Secure Sockets Layer ("SSL") or Secure Shell ("SSH"). Using the control channel, the transfer initiation module 225 handles authentication on behalf of the receiver application 227 by sending credentials to the sender system 201, and can optionally exchange a per-session symmetric encryption key to use in data encryption. The transfer initiation module 225 also handles negotiation of transfer parameters, such as block size, target rate, etc., and exchanges the file or directory metadata for constructing the destination file and resuming partial transfers. Metadata includes attributes such as file name, size, access control parameters, and checksum.

The block ingest module 236 reads data blocks from the network 224. The cryptography module 232 is optional. Embodiments including the cryptography module 232 decrypt encrypted data blocks and verify authentication digests for integrity.

The block handler module 230 processes incoming data blocks. This processing includes extracting a network round-trip time stamp and passing it to the rate calculation module and extracting the path round-trip time stamp and passing it to the timeout predictor module. The processing further includes copying the payload into the disk writer module 234 for egest.

The disk writer module 234 implements logic to maximize receiver input/output ("I/O") speed by minimizing inter-locking between the network reading and disk writing operations. The disk writer module 234 uses a number of buffers and allocates at any time one buffer for network 224 reading and one for disk 252 writing. Once a buffer is filled by the network reader, it is passed to the disk writer module 234 and a new buffer is assigned to the network reader.

The file cache module 238 implements logic to maximize the speed at which blocks are written to disk 252 or system memory by minimizing out-of-sequence writing and writing blocks of optimal size for the particular file system. The data file system destination module 250 is a file or directory on a disk 252 or system memory accessible to the local computer through a file system where received data is written. Data application destination module 229 is a sequence of memory in the receiver 226 application's 227 memory space 229 where received data is written.

The retransmission module 246 stores information of missed data blocks for retrieval by index. The stored information includes sequence number and timestamp of when the missed data block was originally sent. The feedback writer module 248 sends feedback information to the sender system 201. The feedback information can include retransmission requests, statistics, calculated target rate, and any other information related to the exchange of data between the sender system 201 and receiver system 226.

The timeout predictor module 240 calculates the time to wait until requesting retransmission of missed blocks (RTO), using a recursive estimation algorithm that predicts the path round-trip time based on round-trip measurements. The rate control module 242 calculates a target transmission rate according to a configured rate control mechanism specifying a fixed rate or a dynamically adaptive rate as a function of the measured network round-trip time.

The timer module 244 stores the sequence numbers of blocks for retransmission according to the absolute time at which the request for retransmission is due. The absolute time is given by the RTO calculated by the timeout predictor module. The timer module sends a list of block sequence numbers due for retransmission at the current time to the retransmission module. The management interface module 228 provides a monitoring and control interface from which control commands are issued and transfer statistics are read.

The file differencing module 254 evaluates data already present at the receiver system 226 and compares it to the sender system 201 data to determine if any identical data is already present and does not require transmission. In one embodiment, a comparison is made between a receiver file having an identical name to the sender file based on attributes such as size, modified time and a content checksum. If the files are identical no data is transferred. If the file is partially transferred, the file differencing module determines the offset at which the transfer should begin, or resume.

Figure 3:
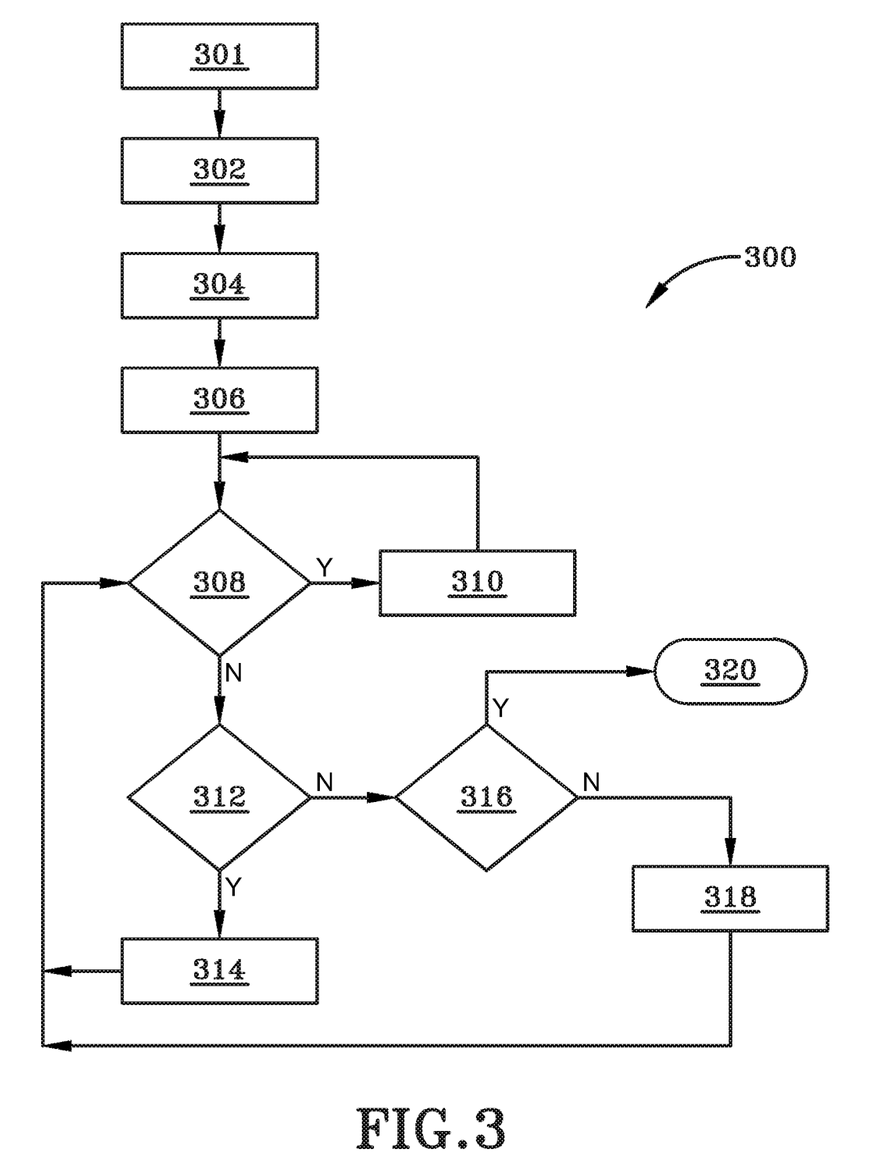
FIG. 3 is a block diagram of a data sending process according to an exemplary embodiment of the present disclosure.

FIG. 3 is a block diagram of a process 300 according to an example embodiment. The process 300 is a computer executable method to send a file, or other data structure, from a source system to a destination system. The process 300 includes generating a schedule based on priority, collaboration, and synchronization 301 to send the file in the schedulers 260, 262 (FIG. 2). The process 300 includes receiving a command to transmit a file or other data structure 302 to a destination system, establishing a connection and exchanging control data with the destination system 304, and breaking the file, or other data structure, into numbered blocks 306. The process 300 further includes determining if a retransmit request has been received and is pending 308 and retransmitting any requested blocks 310 before transmitting any further blocks. The process 300 also includes determining if there are any remaining blocks to transmit 312, transmitting the next block in the numbered sequence 314. If there were no blocks remaining to transmit, the process 300 determines if an indication has been received from the destination system that the last block has been received 316. If that indication has been received, the process terminates 320, else the process retransmits the last block 318.

Figure 4:
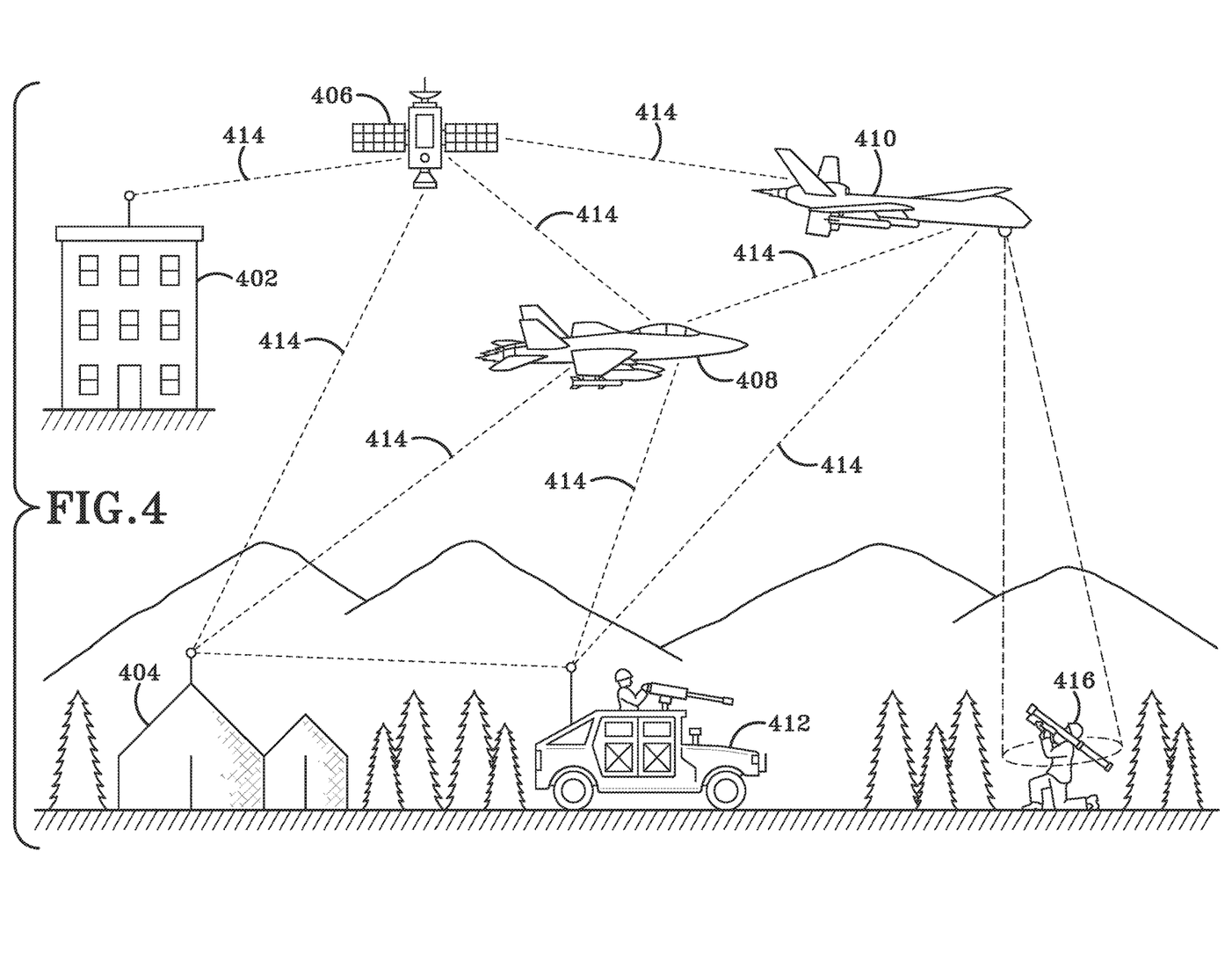
FIG. 4 is schematic environmental view of a communication network having differing nodes.

FIG. 4 diagrammatically depicts portions of the UDP protocol system 200 having multiple nodes in the network 224. A first node 402 may be within a command center. A second node may be at base camp 404. A third node 406 may be carried by a satellite. A fourth node 408 may be carried by manned aerial vehicle. A fifth node 410 may be carried by an unmanned aerial vehicle. A sixth node 412 may be carried by a manned land vehicle. The nodes may be conned via low bandwidth UDP links between each node. The UDP links are shown generally as 414. One of the nodes may gather information about a target 416.

FIG. 4 depicts an example in which an unmanned aerial vehicle gathers surveillance video of the target 416. System 200 provides the prioritized and scheduled transmission from one of the nodes (such as node 410) to any or all of the other nodes in the network 224.

With continued reference to FIG. 4, and in accordance with a non-limiting example of the present disclosure, an exemplary situation presents the need to transfer a significant or large amount of data across a low bandwidth link 414. The present disclosure addresses provides a system that optimizes how to transmit the large amount of data across the low bandwidth link between nodes in the network 224. Initially, the present disclosure addresses this challenge by providing the link 414 that uses a UDP protocol to send data over the low-bandwidth link to provide a solution to transmit as much information along the low bandwidth link as possible. The present disclosure can further provide a protocol to maximize efficiency of the data that is transmitted across the UDP link via schedulers 260, 262. For example, the schedulers 260, 262 builds a set of prioritizations that give the system 200 and/or the system operator the authority to decide which data is most important to be send across the link and at what schedule. However, the scheduler 260 may include an automatic decision engine or a decision module to determine/decide which data is most important (i.e., prioritized) based on previously set or selected rules by the user. Further, the scheduler may include a machine learning module or logic that can analyze data transfer scenarios that can determine to change the schedule or priority of data transfer based on learning scenarios occurring after the original programming of the set or selected rules of the user.

In an automatic configuration, one embodiment of the system of the present disclosure determines data disconnection and reconnection by reestablishing the transmission of data from the last point or time at which the connection or link 414 was lost. This ensures that the transmission stream is not restarted from the beginning such that bandwidth is not wasted by resending data that was previously transmitted across the UDP link 414.

The present disclosure further allows for scheduled transmissions, as determined by schedulers 260, 262 to occur over the communication network 224 between the sender system 201 (i.e., one of the node in FIG. 4) and a receiver system 226 (another node from FIG. 4). For example, large low priority video files may be sent during the evening or night time hours (i.e., inactive periods) so that the main communication channels and bandwidth is available for higher priority smaller type of messages during the day (i.e., active periods), or when the cell is in operation, this provides more tailorability for user or operator of the communication system. Stated otherwise, the system may have active communication periods (such as during the day time in which users are operating the nodes) and inactive communication periods (such as during the nighttime in which the users are not operation the nodes because they are sleeping but the nodes are still otherwise connected) between the first and second nodes. Schedulers 260, 262 transmit high priority data, as determined by a set of rules, during active communication periods, and transmits low priority data, as determined by the set of rules, during inactive communication periods. The higher priority data may relate to active communications needed to be transmitted between the nodes, whereas the lower priority data may be the large low priority video files that can be transferred across the low-bandwidth link 414 via UDP protocol during the nighttime while users are generally asleep and not communicating with active messages.

In operation, the user or operator of the system provides preferences to schedulers 260, 262 to determine the prioritization of messages/data transmission packets that are to be transmitted across the communication links via the UDP protocol through network 224. The user, operator, or system administrator can put together priorities in schedulers 260, 262 and when the messages/data transmission packets are to be transmitted. The time (i.e., when) in which the messages/data transmission packets are transmitted are governed by underlying rules for how the data is to be sent. The user or operator has capabilities to override the priorities if the user or operator determines that it has something that needs to be sent immediately and the user escalate/increase the priority and it would be sent immediately versus the typical schedule. This may be accomplished via a manual data transfer override that interrupts the prioritized and schedule data transfer to transmit data across the low-bandwidth link.

By way of one non-limiting exemplary example, a limiting factor is often bandwidth of link 414. Typically, there is more data that needs to be sent between two nodes (i.e., sender 201 and receiver 226) in a communication network than available bandwidth to send when the communication nodes are operating in a combat theatre. Thus, the entire bandwidth is typically utilized 100% of the time. In this scenario, the schedulers 260, 262 provide that the higher priority items are sent immediately or as soon as possible and the lower priority items are scheduled out to a later time. In a combat theatre scenario, if the user or operator of the communication system determines that a collected image is of a high priority nature (such as one that identifies target 416), the communication system may interrupt the lower priority data being transmitted across the limited bandwidth and send the higher priority image immediately. Note, the determination could be performed manually or automatically through machine-learned instructions. For example, if a user or operator is searching for particular information about a person of interest or target 416, when that person of interest is identified via photograph or video, the user or operator of the system can determine that the photograph or video stream confirming that the person of interest needs to be of utmost importance so that the data file containing the photographic evidence or video evidence of the person of interest can be sent immediately or as soon possible. Alternatively, the data can be pre-set with rules or instructions that indicate that data entry related to a certain database cell quantity is automatically a high priority. For example, if streams of data are entered into a database and a cell of particular interest has a value that exceeds a certain threshold, then is high priority data.

In operation, the scheduler 260, 262 determines for the priority rules of which types of items are to be considered a high priority before the communication system is implemented or constructed. For example, the rules may be generated before the established connection between the first node and the second node to provide the overarching commands or hierarchy for determining which types of items are high priority and would thus need to be bumped up over the lower priority scheduled events. For example, before a soldier is sent into combat, the command center may indicate a rule in the system that says if there is ever any information or digital data captured by photograph or video images containing information on person X (i.e., target 416), then that transmission of the data associated with information about person X automatically has a higher priority over regular communication items or data. Thus, when the soldier takes a picture of person X and tags the image as containing data relating to person X, the communication system automatically, based upon the rules pre-provided to it, reprioritizes and transmits the data of the tagged image across link 414 via UPD protocol at a higher priority than other lower priority items across the network. Also, the rules are variable in that they do not always have to be pre-provided to the communication system. The communication system can have variable rules that allow rules and protocols to be queried to determine whether they should have higher priority in real time. By way of this example, the soldier may take a photograph of person Y (who is different than person X) and request that the communication system provide a higher priority to this image because the soldier needs to transmit this image to the command center so they may determine whether person Y is also a person of interest.

Collaboration and communication between the different nodes or sites in a network is typically a problem because the likelihood of the networks to go down due to D/DIL or other poor communication. The present disclosure overcomes these problems by the scheduler 260, connected to sender system 201, which prioritizes and provisions, when the network user or operator knows that it will be disconnected from other nodes, the scheduler 260 can provision or push data to a particular node before it loses communications so it has all of the data it needs locally. One exemplary data that the node may need in advance prior to its anticipated disconnection includes intelligence information about people in the area, structures, landscape or terrain, some communication channels that may be communicating on, other topics relating to the area such as political or social constraints, or any other general information, that all may be considered to be target 416. Further, the node referred to in this example may refer to a single person carrying the node or a squadron of people utilizing the information or entire battalion. When the node is embodied or carried by an entire battalion, the battalion will have a significant amount of information, often on the order of many gigabytes or terabytes of information, that is readily available at a command center but the battalion may not have reach back connectivity when it is out in the field thus the battalion node must provision the information before it becomes disconnected from the network. Keeping with this example, the information has been provisioned to the node corresponding to the battalion and when the battalion ultimately becomes disconnected, there is still a plethora of new information that is being gathered by said node corresponding to the battalion when the battalion is disconnected. The communication system is configured such that as soon as connectivity is restored over the communication link, the new information that has been gathered begins transferring automatically back and forth between the nodes or sites on the communication network. All of the data that the headquarters, such as a first node has deemed relevant for the battalion to know automatically gets pushed to the battalion or the node corresponding to the battalion and any of the data collected from battalion that is out on patrol is automatically pushed back to the node at the command center. Thus, there is an automated exchange of data between the nodes that does not involve the actual users or operators of the system manually push or designate the information to the system. The provision schedule will determine what information is transmitted, particularly the new information that is gathered during the disconnection period at what schedule. For example, if the amount of data is significant, it would take on the order of multiple days or even weeks or months to transmit the data, some of the data will be more important and cannot wait a month to be transmitted back to the first node at the command center. The prioritization schedule will have been previously provided to the second node in the field prior to its knowledge that communication would be lost such that when the communication is restored, the information that is uploaded occurs in accordance with the prioritization schedule to transmit the information back to the first node at the command center. In one example, the reason the information takes so long to transmit back is that the sensors gather so much high quality data and the bandwidth on the connection network is relatively limited. Thus, the prioritization schedule and utilizing the UDP protocol is advantageous to provide the highest priority data between the nodes on a limited bandwidth communication link.

In one example, a higher priority piece of data may be a communication message such as a chat message or a task to execute for the users or operators of the node. However, some lower priority information may simply include video stream of a remote camera that was set up at a lookout center but did not gather any readily apparent data during its deployment.

Additionally, an embodiment of the present disclosure may then provide a shared workspace integrated with artificial intelligence to machine learn the data that is transmitted across a UDP link to solve aspects of a mission or task. The shared workspace of the first and second nodes or any of the other nodes may be part of the communication network 224. The shared workspace refers to intelligence information that can be shared between multiple nodes in the communication system. For example, if the workspace is a graphical representation of a globe and the nodes are sharing data relating to some of the problems that each respective node has been tasked with, they can be plotted on a map and that the problems that each node or user or operator of each node has been tasked to solve may now share the picture or data across the workspace so that the users or operators at different ends of the communication system can utilize the shared data to collaborate to solve their intelligence task. For example, if a first analyst needs to determine all of the relatives of person X (i.e., target 416), the information gathered regarding person X may be uploaded to the workspace and be compared against the data provided from another node. In this example, another node may determine that person Y has three friends and one of the friends could be a relative of person X. Therefore, the communication system can effectuate collaboration between the nodes to create a link to identify that person X may know person Y. The collaboration operates over the construct that has been provided by the communication system. The collaboration messages are a part or a piece of the data that is sent across the communication links utilizing the UDP UD{protocol that are prioritized in the event that communication low-bandwidth link 414 is lost and then later restored. The collaboration data could be considered as a higher priority item for transmission across the communication network once the link has been restored. In accordance with one aspect of the present disclosure, the collaboration is to be effectuated through an artificial intelligence network that can piece through the high volume of data at a significant speed in order to reduce the amount of manual evaluation.

In one particular embodiment, the communication system of the present disclosure may be embodied as a full software solution that utilizes existing legacy hardware owned by the operator to effectuate the provisions, collaborations, and auto-connectivity through a UDP link to accomplish some of the goals of the communication system to transmit the data between nodes in the communication system once a communication link is re-established.

Figure 5:
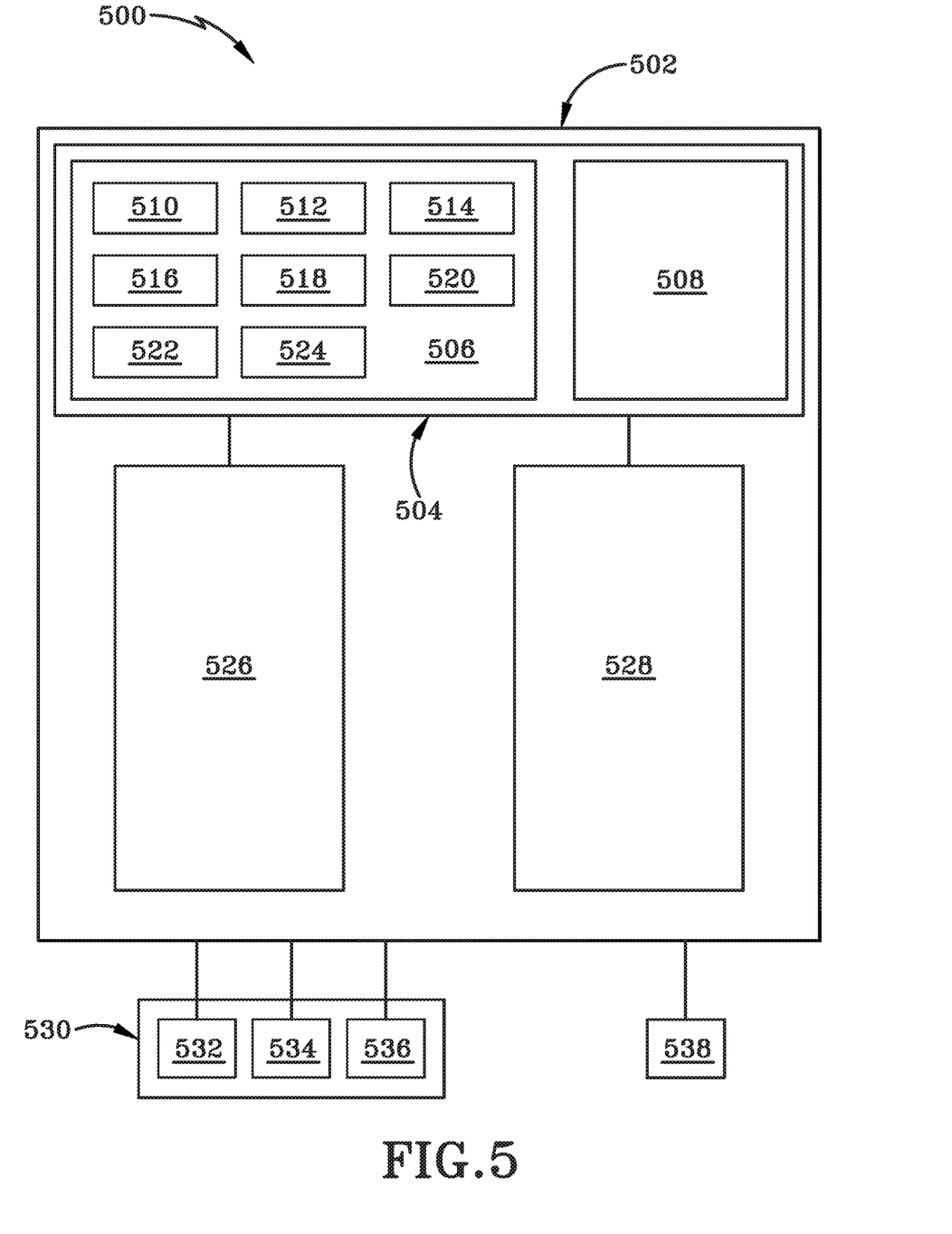
FIG. 5 is an exemplary block diagram of a collaboration and synchronization system in accordance with one aspect of the present disclosure.

FIG. 5 represents the data replication and synchronization capabilities of the scheduler 260, 262 generally at 500. The data replication and synchronization capabilities 500 includes a data sync module 502 having a data integration layer 504. The data integration layer 504 includes a data sync module 506 and a bi-directional transport module 508. The data sync module 506 includes and bandwidth throttling module 510, a prioritization module 512, a customization module 514, a bandwidth monitoring module 516, an AO Centric module 518, a cue management module 520, a time of day module 522, and a QoS module 524.

The date integration layer is connected with data egress module 526 and a data ingress module 528. Data sync module 502 is coupled with external modules 530 including legacy data bases 532 external feeds 534, and external API 536. The data sync module may further be connected with varies application software 538.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system comprising:
a first node;
a second node;
a low-bandwidth link coupling the first node the second node;
a scheduler in operative communication with the first node to prioritize and schedule data for transfer between the first node and the second node across the low-bandwidth link;
a User Datagram Protocol (UDP) to transfer data across the low-bandwidth link that has been prioritized and scheduled by the scheduler; and
a shared workspace for the first and second nodes adapted to share data across the low-bandwidth link, wherein data for the shared workspace is transmitted across the low-bandwidth link via the UDP between the first node and the second node.

2. The system of claim 1, further comprising:
a disconnected, disrupted intermittent, limited, communication (D/DIL) network, wherein the first and second nodes are part of the D/DIL network and the low-bandwidth link is less than about 1.2 Mbps.

3. The system of claim 1, further comprising:
an automatic decision module within the scheduler that prioritizes data for sending higher priority data across the low-bandwidth link via the UDP before lower priority data based on a set of preset rules.

4. The system of claim 3, wherein the automatic decision module interrupts the lower priority data in response to a decision that higher priority data must be sent across the low-bandwidth link via the UDP.

5. The system of claim 3, further comprising:
a machine implemented learning module in operative communication with the automatic decision module within the scheduler for learning additional rules that affect the preset rules based on scenarios occurring after programming the preset rules.

6. The system of claim 5, further comprising:
variable rules in the scheduler that reprioritizes and transmit data based, at least in part on, real-time queries from the first node to the second node.

7. The system of claim 1, wherein the shared workspace between the first and second nodes comprises:
a common graphical representation adapted to represent tasks for each respective node that is similar at both the first node and the second node; wherein data for the common graphical representation is transmitted across the low-bandwidth link via the UDP between the first node and the second node; and a map depicting relational points that collaboratively identify a solution to an intelligence task; wherein data plotted into the map is transmitted across the low-bandwidth link via the UDP between the first node and the second node.

8. The system of claim 1, further comprising:

active communication periods and inactive communication period between the first and second nodes;

wherein the scheduler transmits high priority data, as determined by a set of rules, during active communication periods, and transmits low priority data, as determined by the set of rules, during inactive communication periods.

9. The system of claim 1, further comprising:

a manual data transfer override that interrupts the prioritized and schedule data transfer to transmit data across the low-bandwidth link, wherein data for that overrides and interrupts a previously scheduled data transfer is transmitted across the low-bandwidth link via the UDP between the first node and the second node.

10. A method comprising:

scheduling and prioritizing data in a scheduler for data to be sent from a first node;

transmitting the scheduled and prioritized data from the first node to a second node across a low-bandwidth link via a User Datagram Protocol (UDP);

receiving the scheduled and prioritized data at the second node;

deciding, automatically via an automatic decision module, whether different data having a higher priority should interrupt the low-bandwidth link via the UDP protocol before lower priority data based on a set of preset rules;

interrupting lower priority data and transmitting the higher priority data across the low-bandwidth link via the UDP;

wherein scheduling and prioritizing data in the scheduler is accomplished by coupling a sender scheduler to an application in a sender system first node and coupling a receiver scheduler to an application in receiver system second node and;

using a shared workspace to share the scheduled and prioritized data across the low-bandwidth link, wherein the scheduled and prioritized data for the shared workspace is transmitted across the low-bandwidth link via the UDP between the first node and the second node.

11. The method of claim 10, further comprising:

programming preset rules in the automatic decision module for determining whether higher priority data is to interrupt data on the low-bandwidth link; and learning, via a machine implemented learning module in operative communication with the automatic decision module, supplementary rules that affect the set of preset rules based on scenarios occurring after programming the set of preset rules were programmed.

12. The method of claim 10, further comprising:

resuming transmission of the lower priority data across the low-bandwidth link via UDP subsequent to completing transmission of the higher priority data that interrupted the lower priority data from transmitting, wherein the low priority data resumes from a data packet that was interrupted and does not revert to the initial data packet of the lower priority data.

13. The method of claim 10, further comprising:

identifying a target based on a first portion of data from the first node and a second portion from the second node.

14. The method of claim 10, further comprising:

setting rules in both the sender scheduler and the receiver scheduler to send and receive lower priority data during network inactive periods; and setting rules in both the sender scheduler and the receiver scheduler to reserve bandwidth in the low-bandwidth link to send and receive higher priority data during active periods.

15. The method of claim 10, further comprising:

synchronizing lower priority data with preset rules in the scheduler;

wherein subsequent to interrupting the low priority data includes re-synchronizing the lower priority data with the preset rules in the scheduler.

16. The method of claim 10, further comprising:

responding to variables input from an external node into the network across a low-bandwidth link via UDP;

altering rules in the scheduler for transmitting low priority data to a later time frame; and transmitting higher priority data before the lower priority data in response to requirements of the variable.

17. The method of claim 10, further comprising:

receiving higher priority data including a task message; and interrupting lower priority data including a video file that is larger in data size than the task message.

18. The method of claim 10, wherein the first node and the second node are part of a disconnected, disrupted intermittent, limited, communication (D/DIL) network, and the low-bandwidth link in the D/DIL network is less than about 1.2 Mbps.

19. A computer program product including one or more non-transitory machine-readable media having instructions encoded thereon that, when executed by a processor, cause the processor to scheduling device that coordinates and synchronizes data across low-bandwidth links, wherein the scheduling service comprises:

a first node;

a second node;

a low-bandwidth link coupling the first node the second node;

a scheduler in operative communication with the first node to prioritize and schedule data for transfer between the first node and the second node across the low-bandwidth link;

a User Datagram Protocol (UDP) to transfer data across the low-bandwidth link that has been prioritized and scheduled by the scheduler; and a shared workspace for the first and second nodes adapted to share data across the low-bandwidth link, wherein data for the shared workspace is transmitted across the low-bandwidth link via the UDP between the first node and the second node.

* * * * *